United States Patent [19]
Omi et al.

[11] Patent Number: 5,655,172
[45] Date of Patent: Aug. 5, 1997

[54] CAMERA HAVING FILM CARTRIDGE CHAMBER DISTINGUISHABLE FROM BATTERY CHAMBER

[75] Inventors: Junici Omi, Kawasaki; Daiki Tsukahara, Tokyo; Akio Nishizawa, Kawasaki, all of Japan

[73] Assignee: Nikon Corporation, Tokyo, Japan

[21] Appl. No.: 606,938

[22] Filed: Feb. 26, 1996

[30] Foreign Application Priority Data

Feb. 24, 1995 [JP] Japan .................. 7-037020

[51] Int. Cl.$^6$ .......................... G03B 17/02; G03B 17/26
[52] U.S. Cl. .......................... 396/538; 396/539
[58] Field of Search ................... 354/288, 275, 354/484, 468, 173.1, 149.11; 352/242; 396/512, 516, 535, 538, 539, 536

[56] References Cited

U.S. PATENT DOCUMENTS

| 3,524,393 | 8/1970 | Greger et al. ............... 354/288 |
| 4,214,830 | 7/1980 | Schroder ...................... 354/288 |
| 4,645,325 | 2/1987 | Inoue et al. ................... 354/484 |
| 4,668,070 | 5/1987 | Wakabayashi et al. ........ 354/288 |
| 4,712,898 | 12/1987 | Haraguchi ..................... 354/288 |
| 4,896,178 | 1/1990 | Ohmura et al. ............... 354/288 |
| 4,937,606 | 6/1990 | Soumi et al. .................. 354/288 |
| 5,007,859 | 4/1991 | Sangregory et al. .......... 439/500 |
| 5,066,966 | 11/1991 | Kawana ......................... 354/288 |
| 5,155,512 | 10/1992 | Leonard .......................... 354/82 |
| 5,317,356 | 5/1994 | Dassero ......................... 354/288 |
| 5,422,695 | 6/1995 | Katagiri ....................... 354/173.1 |
| 5,432,575 | 7/1995 | Funahashi ..................... 354/288 |
| 5,473,401 | 12/1995 | Tsunefuji ....................... 354/288 |
| 5,526,084 | 6/1996 | Kataoka et al. ............... 354/288 |

FOREIGN PATENT DOCUMENTS 1533837   6/1968   France ......................... 354/288

Primary Examiner—A. A. Mathews
Attorney, Agent, or Firm—Oliff & Berridge

[57] ABSTRACT

A camera includes a film cartridge receiving portion having a film cartridge chamber, a battery receiving portion having a battery chamber, a film cartridge chamber cover and a battery chamber cover. The film cartridge chamber has a film cartridge chamber opening formed in a top surface or a bottom surface of the camera body. The battery chamber has a battery chamber opening. The film cartridge chamber opening is shaped to correspond to a transverse cross-section of the film cartridge and the battery chamber opening is shaped to correspond to a longitudinal cross-section of the battery. The film cartridge chamber cover is disposed adjacent the film cartridge chamber opening and pivots to open and close that opening. The battery chamber cover is disposed adjacent the battery chamber opening to open and close the battery chamber opening. As a result, confusion between the film cartridge chamber cover and the battery chamber cover is eliminated.

20 Claims, 6 Drawing Sheets

CAMERA HAVING FILM CARTRIDGE CHAMBER DISTINGUISHABLE FROM BATTERY CHAMBER

BACKGROUND OF THE INVENTION

1. Field of the Invention

The present invention relates to a camera, and in particular, to a film cartridge chamber and a battery chamber within the camera that are easily discernible from each other.

2. Background of Related Art

As illustrated in FIG. 9, a conventional camera includes a single opening 101 through which a cartridge chamber and a battery chamber are accessible. The opening 101 of the film cartridge chamber is provided in the back surface of the camera, and the film cartridge chamber cover 102, which opens and closes the opening 101, is attached to rotate about a shaft 103 disposed in the vertical direction on the back surface. A film cartridge is loaded into the film cartridge chamber by inserting it in a direction orthogonal to the axis of the film cartridge. A battery is inserted into a battery chamber adjacent the film cartridge chamber from an opening that is the same as or distinct from (not shown) the opening 101. The opening for the battery is formed in the side surface, back surface or bottom surface of the camera.

In a conventional camera, however, the opening 101 is large enough to cover a substantial portion of the back surface of the camera, as illustrated in FIG. 9. Correspondingly, the film cartridge chamber cover 102 that fits over the opening 101 is also large. When the film cartridge chamber cover 102 is opened in order to insert or remove a film cartridge, a large portion of the internal area of the camera is exposed. Because the film cartridge chamber cover 102 extends rearward when it is open, users experience difficulty in manipulating the camera. As a result, the process of inserting and removing film cartridges can lead to damaged equipment and/or film due to mishandling or missed opportunities for photographs.

It is possible to reduce the size of the opening 101 of the film cartridge chamber and the film cartridge chamber cover. However, if the battery chamber is accessed through the opening 10, the opening 101 must still be dimensioned large enough receive the battery. If a separate opening is used, often the battery chamber cover and the film cartridge chamber cover are substantially similar in size. Thus, distinguishing the two covers based on their external appearance is difficult, especially in low light conditions. A user could, for example, inadvertently open the film cartridge chamber when intending to remove the battery.

SUMMARY OF THE INVENTION

An object of the present invention is to provide a camera in which the film cartridge can be inserted or removed from the film cartridge chamber with ease, and the film cartridge chamber is readily distinguishable from the battery chamber.

The camera according to the present invention has a top surface, a bottom surface, a front surface, a back surface and two side surfaces. The camera includes a film cartridge receiving portion having a film cartridge chamber for receiving a film cartridge and a battery receiving portion having a battery chamber for receiving a battery. The film cartridge chamber has a film cartridge chamber opening formed in either a top surface or a bottom surface that is shaped to correspond to a transverse cross-section of the film cartridge. The battery chamber has a battery chamber opening formed in the camera that is shaped to correspond to a longitudinal cross-section of the battery. A film cartridge chamber cover is pivotally supported adjacent the film cartridge chamber cover to open and close the film cartridge chamber opening. A battery chamber cover is disposed adjacent the battery chamber opening to open and close the battery chamber opening.

The camera preferably includes a first shaft coupled to the film cartridge chamber cover and a second shaft that pivotally supports the battery chamber cover. The first shaft and the second shaft are preferably disposed such that they are not parallel to each other. In a preferred embodiment, the first shaft and the second shaft are disposed such that they are generally orthogonal to each other.

The film cartridge chamber and the battery chamber are preferably configured such that a film cartridge chamber longitudinal axis, which is at least as great as a longitudinal axis of the film cartridge, and a battery chamber longitudinal axis, which is at least as great as a longitudinal axis of the battery, are approximately parallel to each other to minimize required space.

The film cartridge chamber is preferably configured to have a first longitudinal dimension that is greater than or equal to a second transverse dimension, and the battery chamber is preferably configured to have a first longitudinal dimension that is greater than or equal to a second transverse dimension. The film cartridge chamber and the battery chamber are preferably disposed such that the first longitudinal dimensions are approximately parallel.

The battery chamber opening is preferably formed in either of the two side surfaces. In one preferred embodiment, the battery chamber opening is also formed in the back surface. In another preferred embodiment, the battery chamber opening is also formed in either the top surface or the bottom surface.

BRIEF DESCRIPTION OF THE DRAWINGS

A complete understanding of the present invention may be obtained by reference to the accompanying drawings, when considered in conjunction with the subsequent detailed description thereof, in which.

DETAILED DESCRIPTION OF PREFERRED EMBODIMENTS

Figure 1:
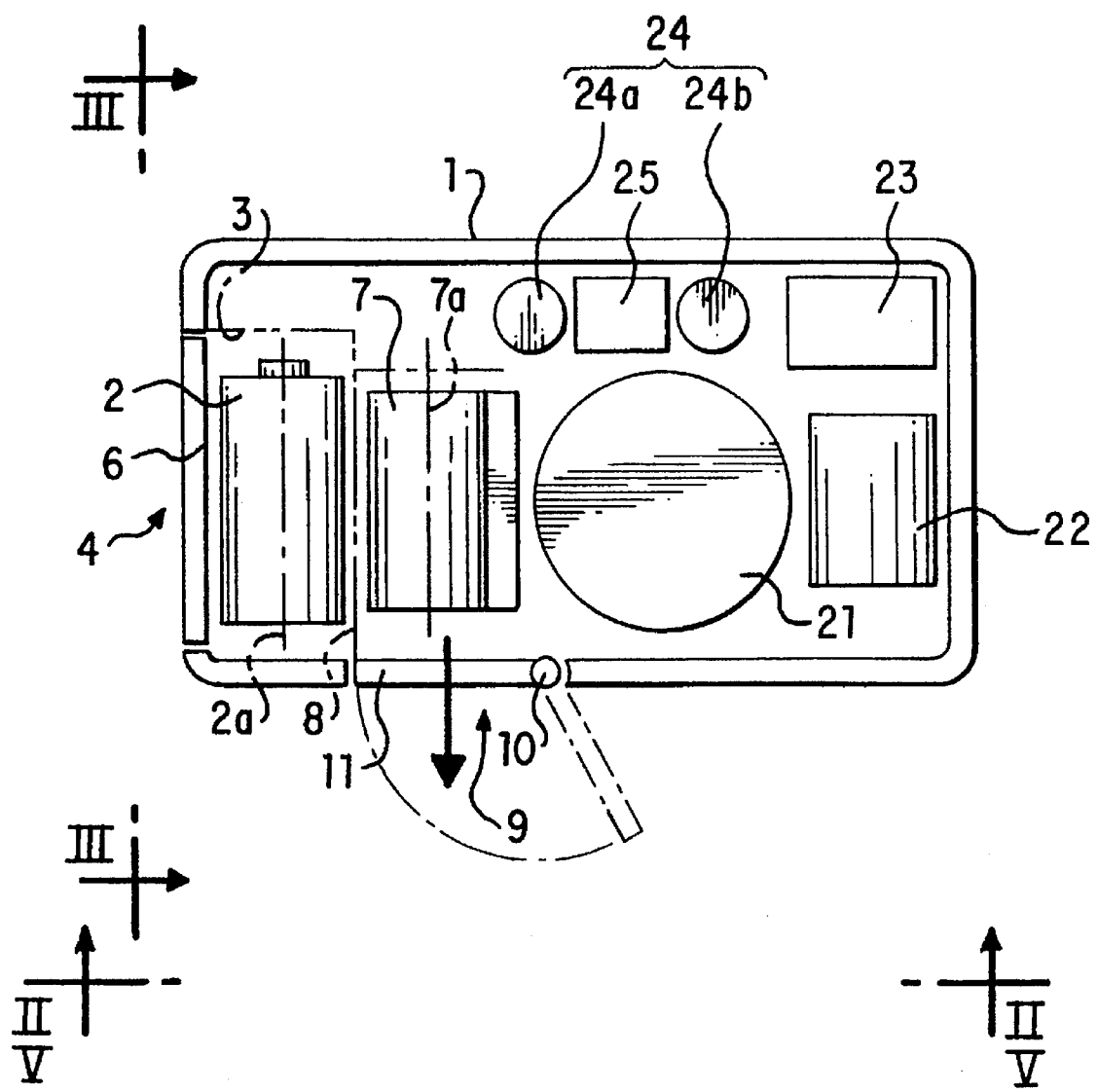
FIG. 1 is a frontal cutaway schematic view of an embodiment of the camera of the present invention as viewed from the line I—I in FIG. 3.
Figure 2:
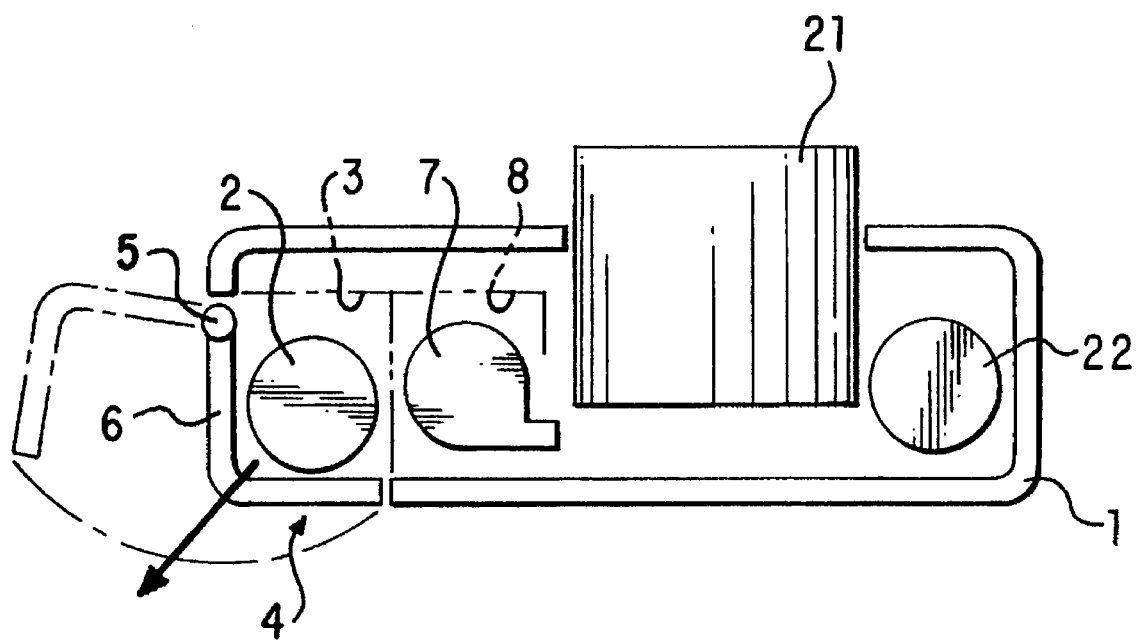
FIG. 2 is a bottom cutaway schematic view of the embodiment as viewed from the line II—II in FIG. 1.
Figure 3:
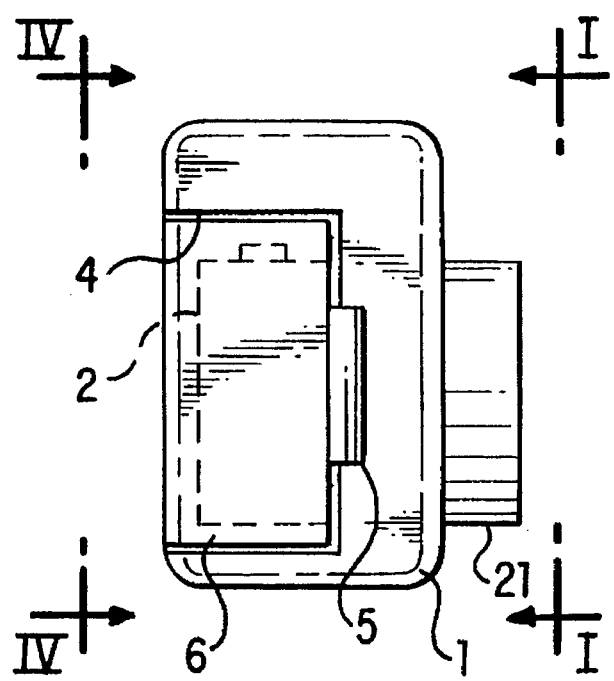
FIG. 3 is a side view of the embodiment as viewed from the line III—III in FIG. 1.
Figure 4:
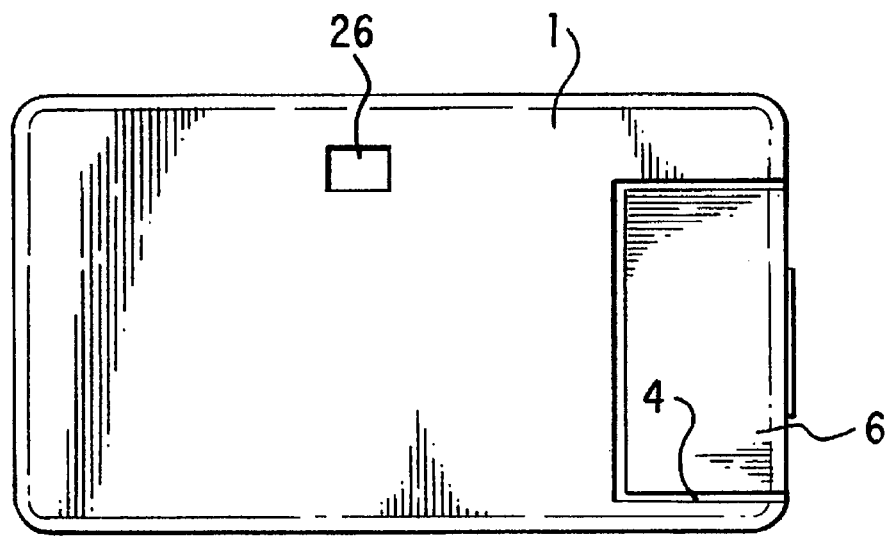
FIG. 4 is a rear view of the embodiment as viewed from the line IV—IV in FIG. 3.

The present invention is described hereafter with reference to FIGS. 1 through 5. The camera of a first embodiment has a cover 1 that includes portions of the top surface, bottom surface, side surfaces and back surface of the camera. A battery chamber 3 disposed to the left as shown in the camera in FIG. 1 houses a cylindrical battery 2 having an axis 2a. The battery 2 is used as the power source for the strobe, the range measurement device, the film supply mechanism and the driving motor for the shooting lens. As shown in FIGS. 2 through 4, an opening 4 in the lower right of the corner extending to the side of the cover 1 provides access to the battery chamber 3. The opening 4 is opened and closed by a battery chamber cover 6 that rotates about a hinge 5 formed by a shaft or pin that extends in the vertical direction of the camera along the left side surface of the camera when viewed from the front.

Figure 5:
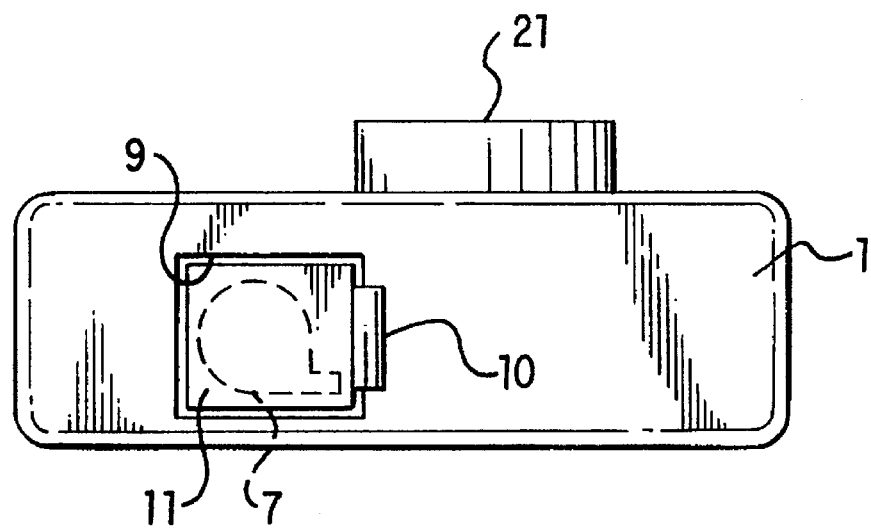
FIG. 5 is a bottom view of the embodiment as viewed from the line V—V in FIG. 1.

A film cartridge chamber 8 that houses a film cartridge 7 having a film cartridge axis 7a is disposed to the right and adjacent the battery chamber 3 as seen in FIG. 1. As shown in FIGS. 1 and 5, the bottom surface of the cover 1 includes an opening 9 providing access to the film cartridge chamber 8. The opening 9 is opened and closed by a film cartridge chamber cover 11 that rotates about a hinge 10 formed by a shaft or pin disposed in the bottom surface of the camera that extends in a direction parallel to the optical axis.

As illustrated in FIG. 1, the camera also includes a lens barrel 21, a film chamber 22, a strobe light 23, an active range measurement unit 24, a viewfinder 25 and a viewfinder eyepiece disposed within the viewfinder 25. The lens barrel 21 extends substantially from the center of the front surface of the camera. The film chamber 22 is disposed inside the camera to the right side and includes a spool (not shown) for winding the film that is supplied from the film cartridge 7. The strobe light unit 23 is disposed above the film chamber 22. The active range measurement unit 24, which includes a light-emitting unit 24a and a light-receiving unit 24b, is disposed adjacent the top of the front surface of the camera. A viewfinder 25 is interposed between the light-emitting unit 24a and the light-receiving unit 24b. The viewfinder eyepiece unit 26 (FIG. 4) is disposed in the back surface of the camera opposite the viewfinder 25.

As shown in FIG. 2, the battery cover 6 is a rectangular plate that is substantially "L" shaped and has a bend of approximately 90°. When the battery chamber cover 6 is closed, it forms a portion of the outer wall of the side surface and back surface of the camera. One edge of the battery cover 6 extending in the vertical direction of the camera is attached to a hinge 5. The battery chamber cover 6 can be rotated about the hinge 5 to open and to close the opening 4 into the battery chamber 3. The opening 4 is shaped to receive the battery 2, which is inserted into the battery chamber 3 in a direction perpendicular to the axis 2a of the battery. In other words, the opening 4 is formed in the shape of the longitudinal cross-section of the battery 2, the height of the opening being slightly greater than the length of the battery 2 in the direction of the longitudinal axis, and the width of the opening being slightly greater than the diameter of the battery 2. As shown in FIGS. 3 and 4, the opening 4 and the battery chamber cover 6 are formed to have the shape of a rectangle with the vertical sides being greater than the horizontal sides when viewed from the back surface or the side surface of the camera.

As shown in FIG. 5, the film cartridge chamber cover 11 is a plate of substantially rectangular shape that forms a portion of the outer wall of the bottom surface of the camera. One edge of the film cartridge cover chamber 11 extending in the direction of the optical axis is attached to a hinge 10. The film cartridge chamber cover 11 can be rotated about the hinge 10 to open and to close the opening 9 of the film cartridge chamber 8. The opening 9 is shaped substantially the same as the film cartridge chamber cover 11. The shape of the opening 9 is determined so that a film cartridge 7 can be inserted in a direction parallel with an axis 7a of the cartridge. In other words, the opening 9 and the film cartridge chamber cover 11 are formed in the shape of a square having the same shape as the transverse cross-section of the film cartridge 7, and, preferably, as shown in FIG. 5, in a substantially rectangular shape just slightly greater than the transverse cross-section of the film cartridge 7.

As described above, the battery chamber cover 6 and the film cartridge cover chamber 11 are formed in shapes that approximate the longitudinal cross-section of the battery 2 and the transverse cross-section of the film cartridge 7. As seen by comparing FIGS. 3 and 5, respectively, the longitudinal dimension of the battery 2 is greater than the transverse dimension of the film cartridge 7.

Accordingly, the battery chamber cover 6 is large enough to be quickly distinguished from the film cartridge chamber cover 11 by visual inspection. Although the lengths of two adjacent sides of the rectangular shape of the film cartridge chamber cover 11 are not substantially different, the lengths of two adjacent sides of the rectangular shape of the battery chamber cover 6 are substantially different when viewed from the exterior. As a result, users do not confuse the two covers.

As described above, the pivot axis of the hinge 5 of the battery chamber cover 6 extends in the vertical direction of the camera, whereas the pivot axis of the hinge 10 of the film cartridge chamber cover 11 extends approximately perpendicular to the pivot axis of the hinge 5 in the direction of the optical axis. Accordingly, the battery chamber cover 6 is opened and closed from the side surface in the direction from the back to the front of the camera; and the film cartridge chamber cover 11 is opened and closed from the bottom surface by pivoting the film cartridge chamber cover 11 with respect to the horizontal direction. In other words, the directions of rotation of the two hinges are distinct. As a result, each hinge has a distinct feel. For example, even if the user, having the intention of opening the battery chamber cover 6, places a hand on the film cartridge chamber cover 11 and tries to open it, the different feel and pivoting direction of the film cartridge chamber cover 11 would signal the user of the error.

When the battery opening 4 is provided in a corner of the camera as in the present embodiment, the battery chamber cover 6 has an L-shape bent form that further distinguishes it from the flat rectangular shape of the film cartridge chamber cover 11. Because the radius traversed in opening and closing the battery cover 6 is substantial, the feel of the battery chamber cover 6 is different from the feel of opening and closing the film cartridge chamber cover 11. When the battery opening 4 is provided in a corner, the cover includes two of the walls of the battery chamber 3. As a result, the inner wall surfaces of the battery chamber 3 can be reduced, which allows the size of the camera to be reduced.

In the description of the preferred embodiment, an example was described in which a cylindrical battery is used. The present invention also applies to a battery having a different shape, including, e.g., the shape of a rectangular solid.

Figure 6A:
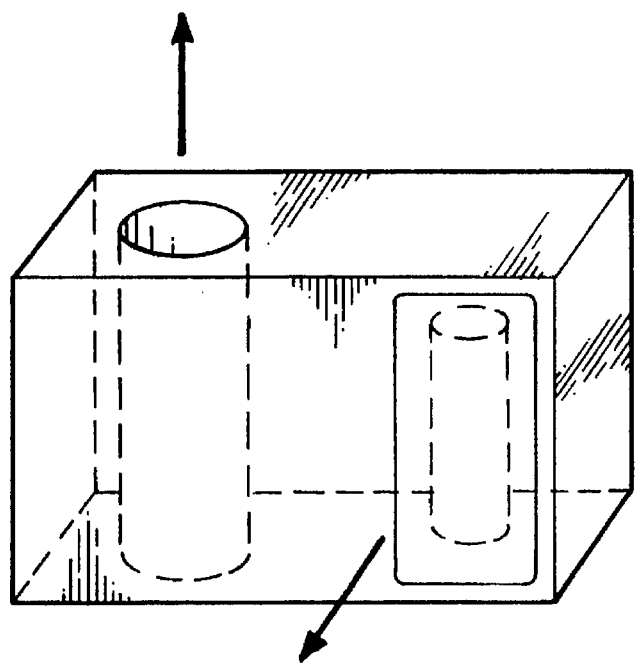
FIGS. 6(a) and 6(b) are perspective schematic views in which the bottom of the camera is oriented towards the top of the page showing variations of the camera of the present invention.
Figure 6B:
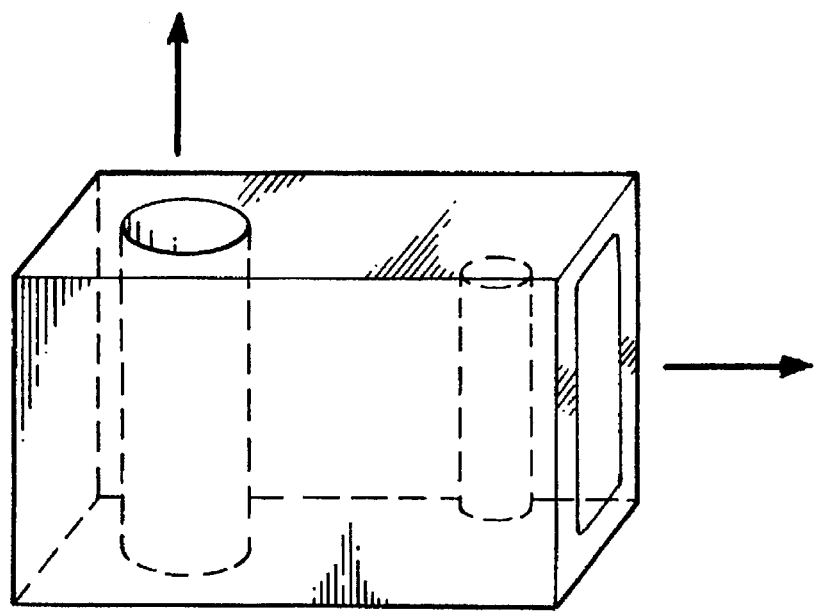
Figure 7A:
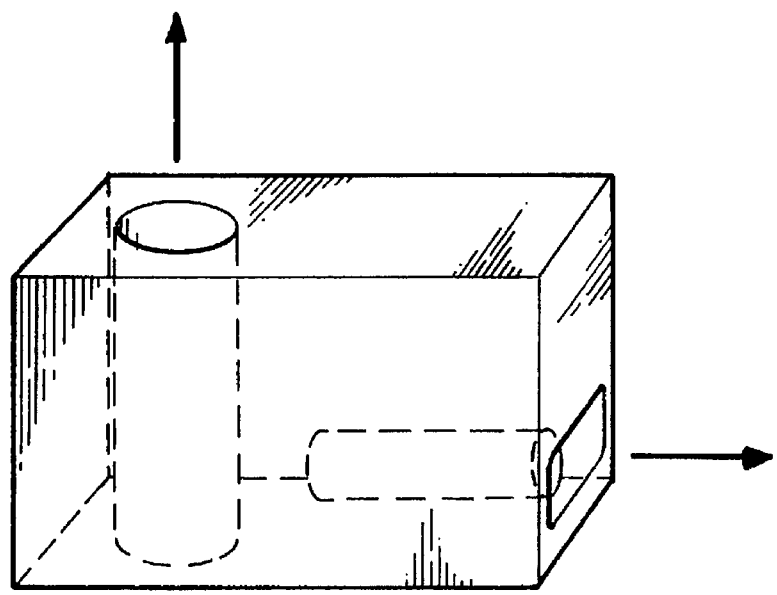
FIGS. 7(a) and 7(b) are perspective schematic views in which the bottom of the camera is oriented towards the top of the page showing other variations of the camera of the present invention.
Figure 7B:
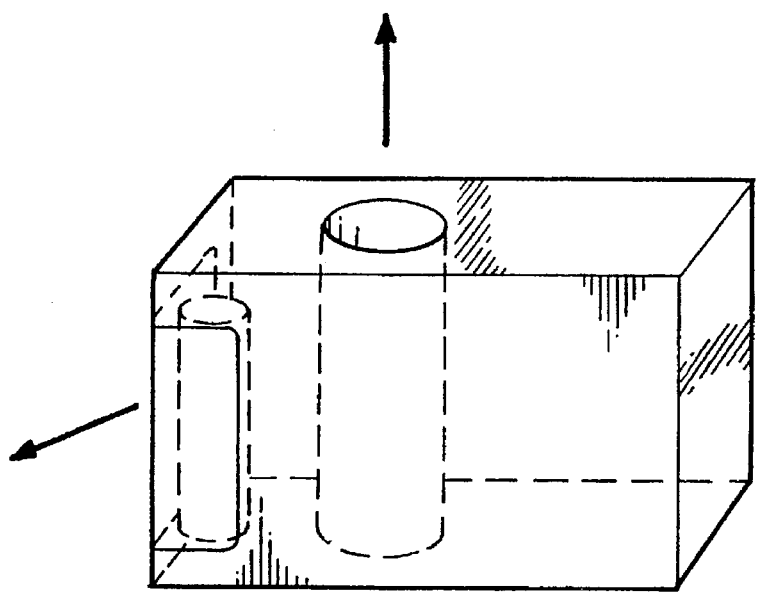
Figure 8:
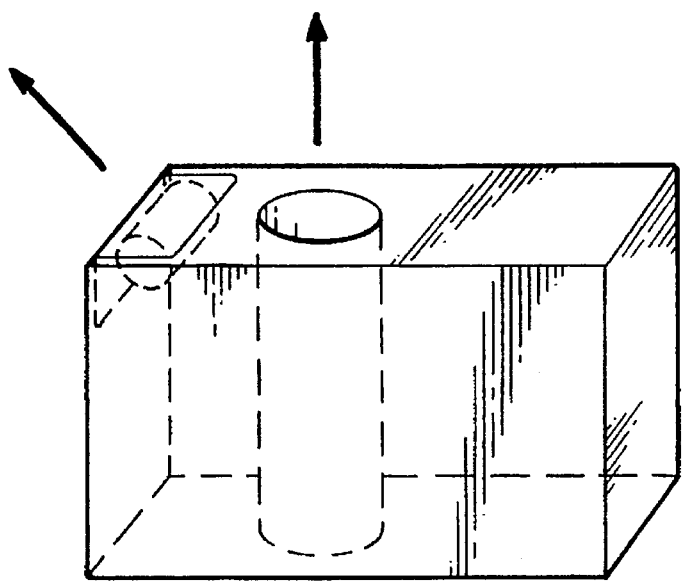
FIG. 8 is a perspective schematic view in which the bottom of the camera is oriented towards the top of the page showing still another variation of the camera of the present invention.
Figure 9:
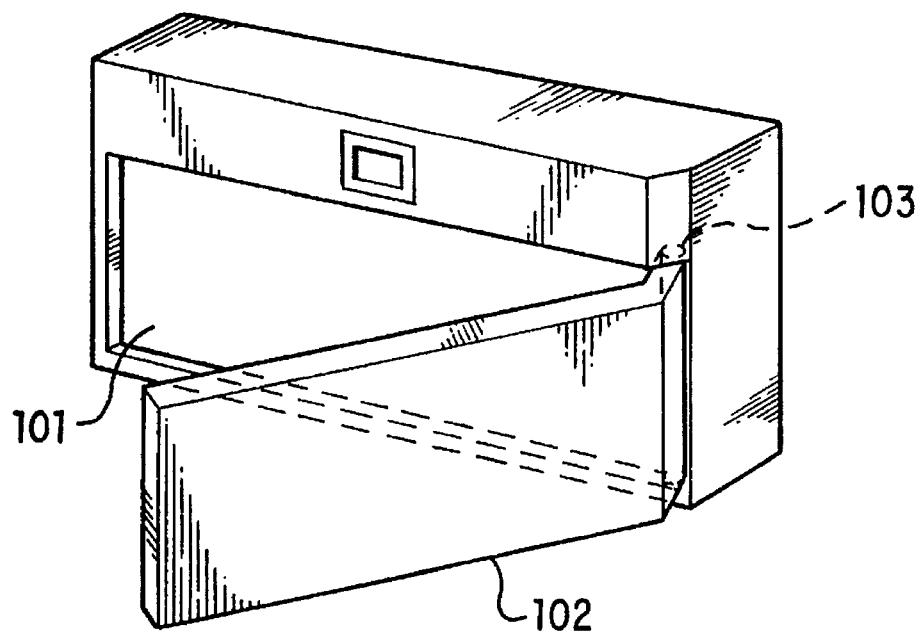
FIG. 9 is an oblique view showing one type of conventional camera.

The present invention is not limited to the case in which the battery chamber cover 6 is disposed as illustrated in the present embodiment. Alternatively, the battery chamber cover 6 can be disposed at various locations on the camera, including, e.g., the examples illustrated in FIGS. 6 through 8. The example shown in FIG. 7(b) corresponds to the embodiment described above.

In each of the variations shown in FIGS. 6(a) through 8, the film cartridge chamber opening and the battery chamber opening are disposed on different sides of the camera, preferably orthogonal to each other. The battery is shown schematically in dashed lines as a small cylinder to illustrate the orientation of the battery relative to the battery chamber opening when the battery is installed in the camera. In the embodiments shown in FIGS. 6(a), 6(b) and 7(b), the longitudinal axis of the battery is approximately parallel to the longitudinal axis of the film cartridge when the battery and the film cartridge are installed in the camera. In the embodiments shown in FIGS. 7(a) and 8, the longitudinal axis of the battery is approximately perpendicular to the longitudinal axis of the film cartridge when the battery and the film cartridge are installed in the camera.

The opening 4 of the present embodiment includes the battery chamber opening, the opening 9 includes the film cartridge chamber opening, the hinge 5 includes the second shaft, and the hinge 4 includes the first shaft.

According to one aspect of the present invention, the film cartridge is inserted into the film cartridge chamber in the direction of the film cartridge axis, whereas the battery is inserted into the battery chamber in a direction orthogonal to the battery axis. Consequently, the respective cross-sectional shapes of the openings and the directions of insertion differ. Accordingly, the external shapes of the film cartridge chamber cover and the battery chamber cover differ such that any similarity between them is eliminated. Thus, confusion between the two covers can be avoided.

Because the second shaft is positioned in a direction perpendicular to the first shaft in one embodiment, the direction of opening and closing the film cartridge cover differs from the direction of opening and closing the battery cover. Accordingly, the different directions for operating the two covers further distinguishes them from each other.

Another advantage arising from positioning the film cartridge and the battery such that the film cartridge axis and the battery axis are parallel to each other is that dead space inside the camera is reduced. Thus, the overall size of the camera can be reduced.

Although this invention is described in conjunction with specific embodiments thereof, many alternatives, modifications and variation swill be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A camera having a top surface, a bottom surface, a front surface, a back surface and two side surfaces, comprising:

a film cartridge receiving portion having a film cartridge receiving chamber for receiving a film cartridge, a film cartridge chamber opening being formed in one of said top surface and said bottom surface and in communication with said film cartridge chamber, wherein said film cartridge chamber opening is shaped to substantially conform to a transverse cross-section of the film cartridge;

a battery receiving portion having a battery chamber for receiving a battery, a battery chamber opening being formed at least partly in one of said side and back surfaces and in communication with said battery chamber, wherein said battery chamber opening is shaped to substantially conform to a longitudinal cross-section of the battery;

a film cartridge chamber cover pivotally supported adjacent said film cartridge chamber opening to open and close said film cartridge chamber opening;

a battery chamber cover disposed adjacent said battery chamber opening to open and close said battery chamber opening.

2. The camera of claim 1, further comprising a first shaft coupled to said film cartridge chamber cover and a second shaft that pivotally supports said battery chamber cover.

3. The camera of claim 2, wherein said first shaft and said second shaft are not parallel to each other.

4. The camera of claim 2, wherein said first shaft and said second shaft are generally orthogonal to each other.

5. The camera of claim 1, wherein said film cartridge chamber has a film cartridge chamber longitudinal axis at least as long as a longitudinal axis of the film cartridge and said battery chamber has a battery chamber longitudinal axis at least as long as a longitudinal axis of the battery, and wherein said film cartridge chamber longitudinal axis and said battery chamber longitudinal axis are approximately parallel to each other.

6. The camera of claim 1, wherein said film cartridge chamber has a first longitudinal dimension and a second transverse dimension and said first longitudinal dimension is at least as great as said second transverse dimension, and wherein said battery chamber has a first longitudinal dimension and a second transverse dimension and said first longitudinal dimension is at least as great as said second transverse dimension, said film cartridge chamber and said battery chamber being disposed such that said first longitudinal dimension of said film cartridge chamber and said first longitudinal dimension of said battery chamber are approximately parallel to each other.

7. The camera of claim 1, wherein said battery chamber opening is formed entirely in one of said two side surfaces.

8. The camera of claim 1, wherein said battery chamber opening is formed entirely in said back surface.

9. The camera of claim 1, wherein said battery chamber opening also is partly formed in one of said top surface and said bottom surface.

10. The camera of claim 1, wherein said battery chamber cover forms a portion of said battery chamber.

11. A camera having a cover that includes a top surface, a bottom surface, a front surface, a back surface and two side surfaces, comprising:

a film cartridge receiving portion having a film cartridge chamber for receiving a film cartridge and a battery receiving portion having a battery chamber for receiving a battery, said film cartridge chamber having a film cartridge chamber opening formed in one of said top surface and said bottom surface and a film cartridge chamber cover pivotally disposed adjacent said film cartridge chamber opening to pivot on a first axis, said battery chamber having a battery chamber opening formed at least partly in one of said side and back surfaces and a battery chamber cover pivotally disposed adjacent said battery chamber opening to pivot on a second axis, wherein said first axis and said second axis are approximately perpendicular.

12. The camera of claim 11, further comprising a first shaft coupled to said film cartridge chamber cover and a second shaft coupled to said battery chamber cover, wherein said film cartridge chamber cover pivots on said first shaft and said battery chamber cover pivots on said second shaft, said first shaft and said second shaft being disposed perpendicular to each other.

13. The camera of claim 11, wherein said battery chamber opening is formed entirely in one of said two side surfaces.

14. The camera of claim 13, wherein said battery chamber opening is formed entirely in said back surface.

15. The camera of claim 11, wherein said battery chamber opening also is partly formed in one of said top surface and said bottom surface.

16. The camera of claim 11, wherein said battery chamber cover forms a portion of said battery chamber.

17. The camera of claim 11, wherein said battery chamber opening is shaped to correspond to a longitudinal cross-section of the battery.

18. The camera of claim 11, wherein said film cartridge chamber opening is shaped to correspond to a transverse cross-section of the film cartridge.

19. The camera of claim 11, wherein said film cartridge cover is shaped to correspond to said film cartridge chamber opening.

20. The camera of claim 11, wherein said battery chamber cover is shaped to correspond to said battery chamber opening.

* * * * *